Feb. 2, 1960

G. E. SELDON 2,923,313

CONSTANT LEVEL MECHANISM FOR CARBURETORS

Filed Aug. 14, 1957

INVENTOR.

George E. Seldon

Feb. 2, 1960 G. E. SELDON 2,923,313
CONSTANT LEVEL MECHANISM FOR CARBURETORS
Filed Aug. 14, 1957 2 Sheets-Sheet 2

INVENTOR.
George E. Seldon.

United States Patent Office 2,923,313
Patented Feb. 2, 1960

2,923,313

CONSTANT LEVEL MECHANISM FOR CARBURETORS

George E. Seldon, Kirkwood, Mo.

Application August 14, 1957, Serial No. 678,188

7 Claims. (Cl. 137—408)

This invention lies in the field of constant level mechanisms especially as applied to carburetors. It is an extension of the elementary improvement shown in my Patent Number 2,790,633 and application Serial Number 578,680, filed April 17, 1956, now Patent No. 2,882,028, granted April 14, 1959. While it is applied to a carburetor here, there is no reason why it could not be applied to many other devices using constant level mechanisms.

The object of this invention is to provide a constant level mechanism suitable for many applications but especially carburetors that is simple, reliable and easy to manufacture.

An object of this invention is to provide a pan type level mechanism that provides a liquid counterpoise in lieu of a weight or spring as shown in the previous disclosures.

It is an object of this invention to provide a pan type level mechanism that depends on its charge of liquid alone to balance and counterbalance the sensing mechanism.

It is an object of this invention to increase the reliability of the mechanism, and to prevent liquid fuel spilling out of the reservoir.

Figure 1:
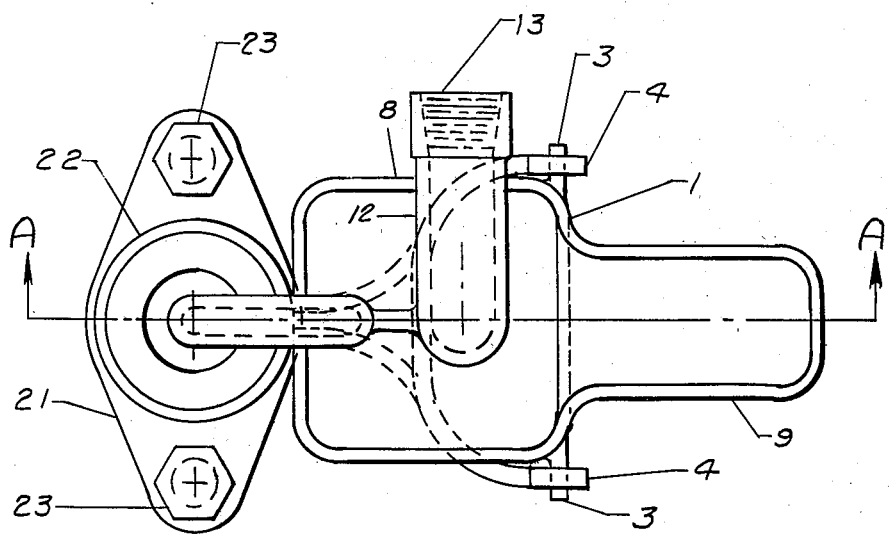
Figure 1 shows a plan view of the device as applied to a vehicular carburetor. It shows a pan open on the top permitting the free surface of the liquid to rise and fall to various depths of liquid in the pan.
Figure 2:
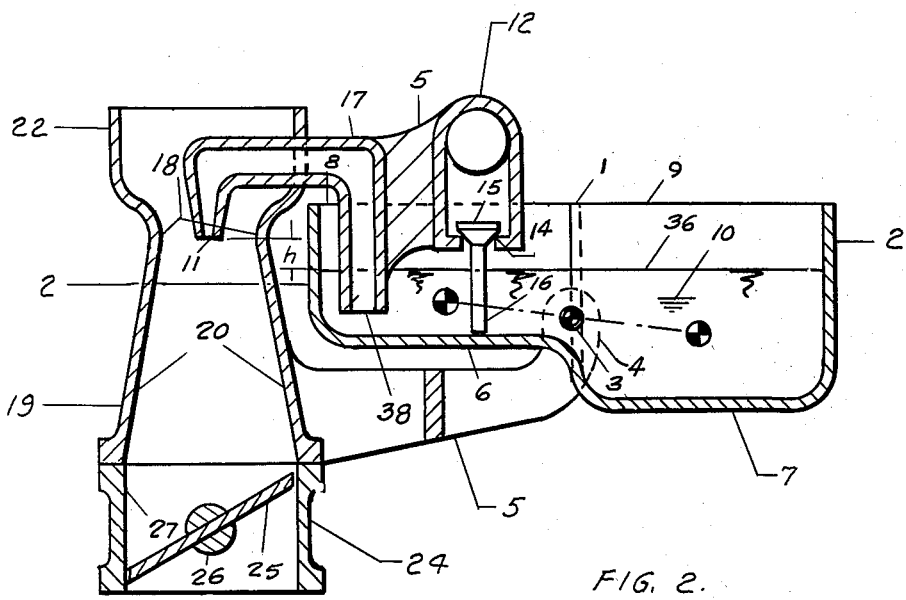
Figure 2 shows section A—A of Figure 1.

In Figures 1 and 2, 1 is a pan having straight vertical sides 2. The pan has trunnions 3 which turn in bearings 4 of the frame 5. The pan is divided into two parts. The part 8 to the left of the trunnions is wide and shallow with its floor 6 higher than the floor 7 of the narrower part of the pan. The wide part 8 and the narrow part 9 of the pan combine to provide the pan type reservoir 1. This reservoir receives and stores the liquid 10. A prescribed quantity of liquid 10 in the pan puts the top (free) surface of the liquid a distance "h" below the outlet orifice 11, which can be considered a reference point of the frame 5. The quantity of liquid to the right of the trunnions in the narrow section 9 of the pan is substantially equal to the quantity in the wide section 8, also the moment arms of these quantities about the trunnions are substantially equal. So the pan is balanced about the trunnions when the prescribed quantity of liquid is in the pan.

The frame 5 comprises the main casting and includes the inlet tube 12 which has a threaded female boss 13 at one end to accept a fitting which is at the end of the fuel system supplying the carburetor with liquid fuel. The fitting, etc., is standard and has no novelty so it is not included in the drawing. The other end of the tube 12 has a seat 14 which is closed by a valve 15 and has a stem 16 that contacts the upper surface of the floor 6.

As the pan moves about the trunnions 3 the floor 6 moves up and down moving the valve, lifting it off the seat or permitting it to rest on the seat as shown, for the prescribed quantity of liquid seen in the pan 1.

The frame 5 also includes the outlet tube 17 with its inlet 18 dipping into the liquid fuel 10. The tube 17 converges into an outlet orifice 11. This orifice is located at the throat 18, the narrowest section of the venturi 19. The face of the outlet orifice 11 is the frame's reference point for measuring the elevation of the surface of the liquid in the pan.

The venturi 19 is also part of the carburetor frame casting. It has the throat 18 and an expanding tube 20, a flanged base 21 at the bottom and an inlet tube 22 at the top. The flange 21 has bolts 23 to attach it to the throttle body 24.

The throttle body 24 has a butterfly valve 25 on a shaft 26. The butterfly valve is machined to fit the bore 27 of the throttle body castings. The throttle body usually is bolted to the intake manifold casting of an engine and the manifold is not novel in this application so is not shown. Thus these carburetors are subject to engine vibration in addition to road vibration, since these Fig. 1 through Fig. 4 carburetors are improvements on my former carburetors which were also vehicular carburetors. These vibrations produce waves on any free liquid surface when stored in an open top reservoir. Much of this liquid fuel can spill over the walls of the reservoir and become a fire hazard. The ceiling 29, at least prevents spilling fuel over the walls of that part of the reservoir which it covers. Because the ceiling 29 covers part of the reservoir the remaining area is smaller and the waves are smaller and the vertical walls 33 of the remainder of the reservoir are now able to prevent all spilling of fuel except those waves produced by the most violent vibrations of the engine plus vehicle.

Figure 3:
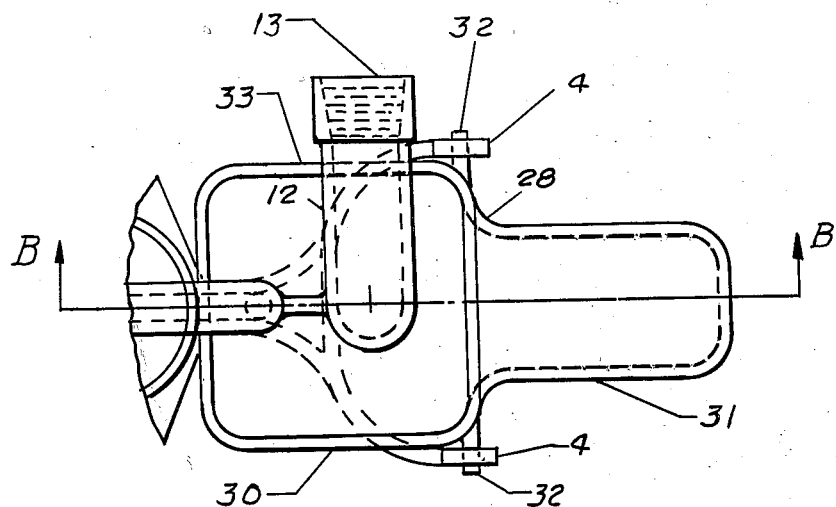
Figure 3 shows a plan view of a pan with a ceiling covering part of the pan, to limit the quantity of liquid that can be put in that portion of the pan.
Figure 4:
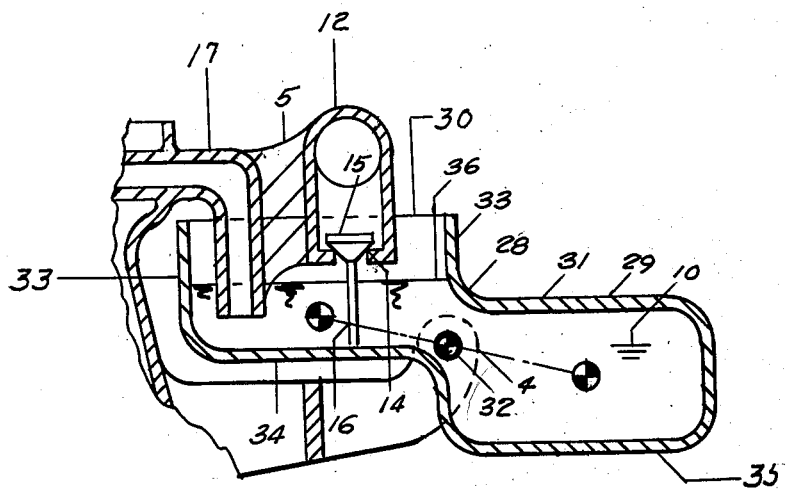
Figure 4 shows section B—B of Figure 3, showing the location of the ceiling member.

Figures 3 and 4 show a further refinement over pan 1. Here pan 28 differs from pan 1 because it has a ceiling 29 covering one side of the pan to the right of the trunnion pins 32. The ceiling 29 is placed low in the pan, so that the prescribed quantity of liquid completely fills the narrow portion of the pan 3. This wets the lower surface of the ceiling 29 and overflows into the remainder of the pan where the free surface rises to an elevation slightly above the lower surface of ceiling 29. Consequently in operation the wetted ceiling is under a slight hydraulic pressure or head. This ceiling 29 effectively prevents fuel from sloshing out of that part of the pan under it. The ceiling 29 submerged in the liquid as described above forces enough fuel to overflow into the open topped part of the reservoir, so that all changes in elevation of the fuel surface take place in the side of the reservoir opposite that covered by the ceiling 29. This puts the ceiling constantly under a slight hydraulic pressure. In Figures 3 and 4, the pan 28 again has a wide part 30 and a narrow part 31. This pan 28 also has trunnions 32 resting in bearings 4 of the frame 5. The wide part 30 of the pan 28 has vertical sides 33. Pan 28 has a high floor 34 and a lower floor 35.

In operation as before stated, a source of liquid fuel under pressure is attached to the boss 13 and liquid flows to the seat 14 through tube 12. If there is no liquid in the pan 28, the valve will be lifted off its seat and the liquid will flow into the pan type reservoir 1. The liquid flows down hill to the lower part of the pan in the narrow side 9 and a moment tending to open the valve further is now created by the weight of the liquid to the right of the trunnion. As the pan fills however, the fuel level rises and flows over the floor 6 and since the area of the floor 6 is greater than the floor 7, the weight of liquid to the left of the trunnion increases at a faster rate than the weight on the side 9 and soon is equal to the weight of liquid on that side and equilibrium is established. At this point the valve 15 is just seated on the seat 14 and liquid no longer flows into the pan. This quantity of liquid is the prescribed quantity and will produce the head "h" or distance "h" between the upper surface 36 of the liquid 10 and the outlet jet 11. Note as the liquid fuel is withdrawn out of the pan through the jet, the surface drops uniformly, but since the surface area on the left side 8 is greater than the surface area on the right side 9, a greater weight of liquid is withdrawn from the left side. The left side becomes lighter than the right side, producing a couple tending to rotate the pan about the trunnions. Since there is little friction the pan 1 soon turns clockwise lifting the valve off the seat permitting liquid to flow into the pan and restore the prescribed quantity of liquid in the pan.

If there is a period of steady rate of flow out of the pan, a quantity of liquid less than the prescribed quantity will remain in the pan during the period. The deficiency from the prescribed quantity depends on the rate of flow out of the pan.

Figures 3 and 4 show a pan with a ceiling plate 29 covering the right or narrow side 31 of the pan 28. The prescribed quantity of liquid is exactly the same as in Figures 1 and 2 and this pan can replace pan 1 in function and space. That is, it is completely interchangeable with pan 1. The ceiling 29 limits the quantity of liquid that can be held on the right side 31 of the pan 28 and the turning couple tending to rotate the pan for a given change in liquid depth is greater than in pan 1. Now the change in the quantity of liquid on the open side of the pan only controls. Its center of gravity is to the side of the fulcrum and is most effective as turning effort on the pan.

The turning couple available to lift the valve 15 is proportional to the net moment about the trunnions of weight of the pans and contents distributed on each side of the trunnions. Since the left and right parts of the pan proper are substantially equal, it is only necessary to consider the liquid itself. Since the free exposed surface of the liquid is always horizontal a small change in depth has a uniform thickness. The net turning couple is proportional to the difference of the moments of the exposed liquid surface areas on opposite sides of the trunnion. Exposed liquid surface area is that area which is the top surface of the liquid; it is exposed to the air and is free to rise and fall as required in the pan. Hence assuming the left side 8 of the pan has four square inches of exposed area and the arm to the center of gravity of the area is 1" long, then the moment of the area to the left of the trunnion is $4 \times 1 = 4$ inches cubed. Assume also that the free surface area of the right side of the pan is 2" square and the center of gravity of this area is also 1" to the right of the trunnion 3 then the moment of the area is $2 \times 1 = 2$ inches cubed and the net moment is 4 inches cubed—2 inches cubed=2 inches cubed. The actual moment=$2dw$ where $d$=thickness change and $w$=weight of liquid per cubic inch.

For any change $d$ in the depth of liquid in the pan the change in the couple $c$ is $c = wd (A_L L_L - A_R L_R)$. $A_R$=liquid surface area in square inches of right side of pan; $A_L$=liquid surface in square inches of left side of pan; $L_L$ and $L_R$=distance of c.g. of area to trunnion, left and right distances respectively.

Now for Figures 3 and 4, $A_R$ disappears and the net turning moment available to move the valve is increased over that shown for Figures 1 and 2 and for Figures 3 and 4, $c = wd(A_L L_L - 0)$. Among the advantages inherent in the construction is the fact that a larger supply of gasoline is always present than is possible where the weight is used as a counterbalance instead of gasoline. To illustrate, carburetors must be subjected to a heat-soak test in which they are required to stand in a hot environment for a certain period of time and then cause the engine to restart quickly. Where the supply of gasoline is limited, it may all evaporate from the carburetor when the engine is not running, unless an adequate supply is present. So, aside from the fact that the present carburetor is lighter in weight, it also has the advantage of having a larger supply of gasoline present at all times.

I claim:

1. In a constant liquid-level mechanism: a liquid reservoir having a fulcrum about which it can rock; an inlet tube for conducting liquid into the reservoir and an outlet for conducting liquid from the reservoir; the reservoir having its horizontal area on the first side of the fulcrum greater than its horizontal area on the second side of the fulcrum, whereby change in top liquid level in the reservoir produces a greater change in rocking force on the first side, the floor of the reservoir on the second side being lower than the floor on the first side whereby the second side begins to fill before the first side; means including a valve between the inlet and the reservoir, having connection to the reservoir to be opened by the upward rocking of the first side of the reservoir and closed by downward rocking thereof, and when closed, establishing a predetermined liquid level in the reservoir; the reservoir when empty being weighted so as to open the valve, and the lower floor on the second side producing initially increasing opening forces as the reservoir is initially charged with liquid, followed by greater increase in closing forces after liquid begins to charge both sides.

2. The mechanism of claim 1, wherein there is a cover over at least part of the second side of the reservoir at least no higher than the predetermined liquid level of the reservoir obtained when the valve is closed.

3. The mechanism of claim 1, wherein there is a cover over at least part of the second side of the reservoir having its lower surface below the predetermined liquid level of the reservoir obtained when the valve is closed, whereby when the second side is filled to the cover it establishes a rocking force on that side of the reservoir that does not change during further loading of liquid into the reservoir.

4. The mechanism of claim 2 wherein the volume of liquid on the two sides of the reservoir is substantially equal when the liquid attains the predetermined level obtained when the valve is closed.

5. In a constant level mechanism; a reservoir having a fulcrum about which it can rock; an inlet tube for delivering liquid into the reservoir and an outlet for conducting liquid from it; means including a valve operated by rocking of the reservoir to admit or check flow of liquid into the reservoir; the first side of the reservoir, on the first side of the fulcrum, having a liquid level regulated by the valve and the withdrawal of liquid; with a predetermined liquid level established upon closure of the valve, the horizontal area of the second side being smaller than, but at least about half that of the first; the second side of the reservoir, on the second side of the fulcrum, having a cover over at least a part thereof, the cover being no higher than the predetermined liquid level aforesaid; so that the second side of the reservoir can establish a counter-balancing force of predetermined amount that does not vary when the liquid level changes above it.

6. The mechanism of claim 5 wherein the cover is below the predetermined liquid level aforesaid, so that the variations in liquid level during operation of the mechanism do not affect the rocking force produced by the second side.

7. The mechanism of claim 6, wherein the bottom of the second side is below that of the first so that the second side starts to fill before the first.

References Cited in the file of this patent

UNITED STATES PATENTS

| | | |
|---|---|---|
| 2,496,046 | Gilbough | Jan. 31, 1950 |
| 2,588,567 | Perlman | Mar. 11, 1952 |
| 2,790,633 | Seldon | Apr. 30, 1957 |